United States Patent
Hanrahan et al.

(10) Patent No.: US 6,349,346 B1
(45) Date of Patent: Feb. 19, 2002

(54) CONTROL FABRIC UNIT INCLUDING ASSOCIATED CONFIGURATION MEMORY AND PSOP STATE MACHINE ADAPTED TO PROVIDE CONFIGURATION ADDRESS TO RECONFIGURABLE FUNCTIONAL UNIT

(75) Inventors: Shaila Hanrahan; Christopher E. Phillips, both of San Jose, CA (US)

(73) Assignee: Chameleon Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/401,194

(22) Filed: Sep. 23, 1999

(51) Int. Cl.⁷ .......................... G06F 13/00; G06F 17/50
(52) U.S. Cl. ................ 710/9; 710/10; 710/26; 710/130; 326/38; 326/39; 716/18; 716/17
(58) Field of Search ................ 710/16, 63, 130, 710/9, 10, 26; 712/233, 245; 700/7, 23; 360/69; 326/38, 39; 716/18

(56) References Cited

U.S. PATENT DOCUMENTS

| | | | |
|---|---|---|---|
| 4,500,933 A | * 2/1985 | Chan | 360/69 |
| 4,617,479 A | * 10/1986 | Hartmann et al. | 307/465 |
| 4,755,967 A | * 7/1988 | Gabris et al. | 712/233 |
| 4,831,285 A | * 5/1989 | Gaiser | 326/39 |
| 4,876,466 A | * 10/1989 | Kondou et al. | 326/38 |
| 4,972,105 A | * 11/1990 | Burton et al. | 326/39 |
| 5,386,518 A | * 1/1995 | Reagle et al. | 710/130 |
| 5,796,944 A | 8/1998 | Hill et al. | 709/250 |
| 5,796,994 A | * 8/1998 | Chambers et al. | 713/500 |
| 5,825,199 A | * 10/1998 | Shelton et al. | 326/38 |
| 5,887,165 A | * 3/1999 | Martel et al. | 713/100 |
| 6,097,988 A | * 8/2000 | Tobias | 700/23 |

* cited by examiner

Primary Examiner—Thomas Lee
Assistant Examiner—Tammara Peyton
(74) Attorney, Agent, or Firm—Burns Doane Swecker & Mathis LLP

(57) ABSTRACT

A reconfigurable system is arranged to have separate control and the data paths. The control path is set up using control fabric units which use an associated state machine to produce an address to a functional unit memory. The functional unit memory then produces the configuration data for the functional units. The use of a state machine allows for a very dense, highly-sequencable control unit that provides an encoded state to a memory which then allows a high number of control terms which results in a more linear interconnection to the data path units.

31 Claims, 18 Drawing Sheets

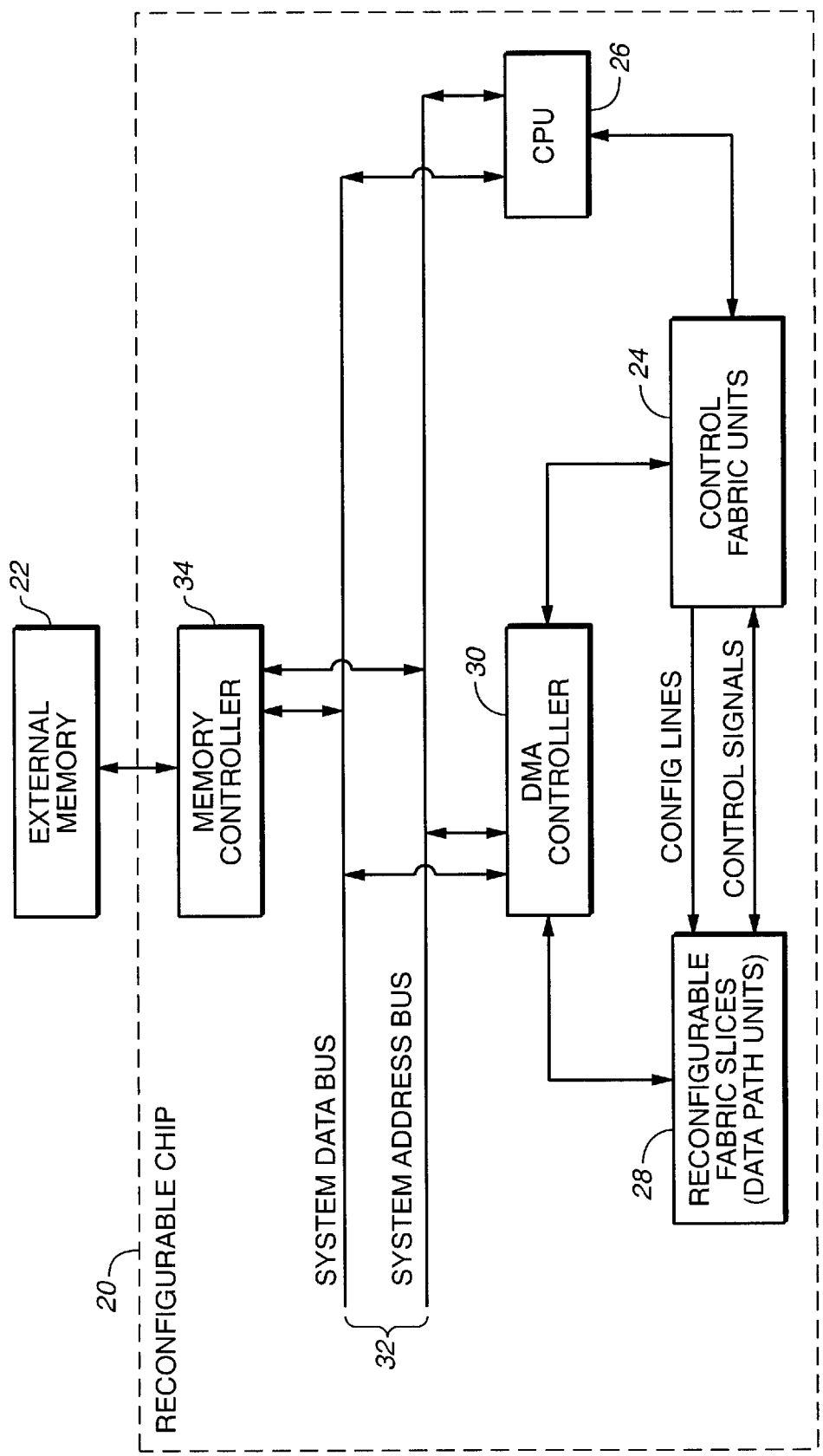
FIG._1

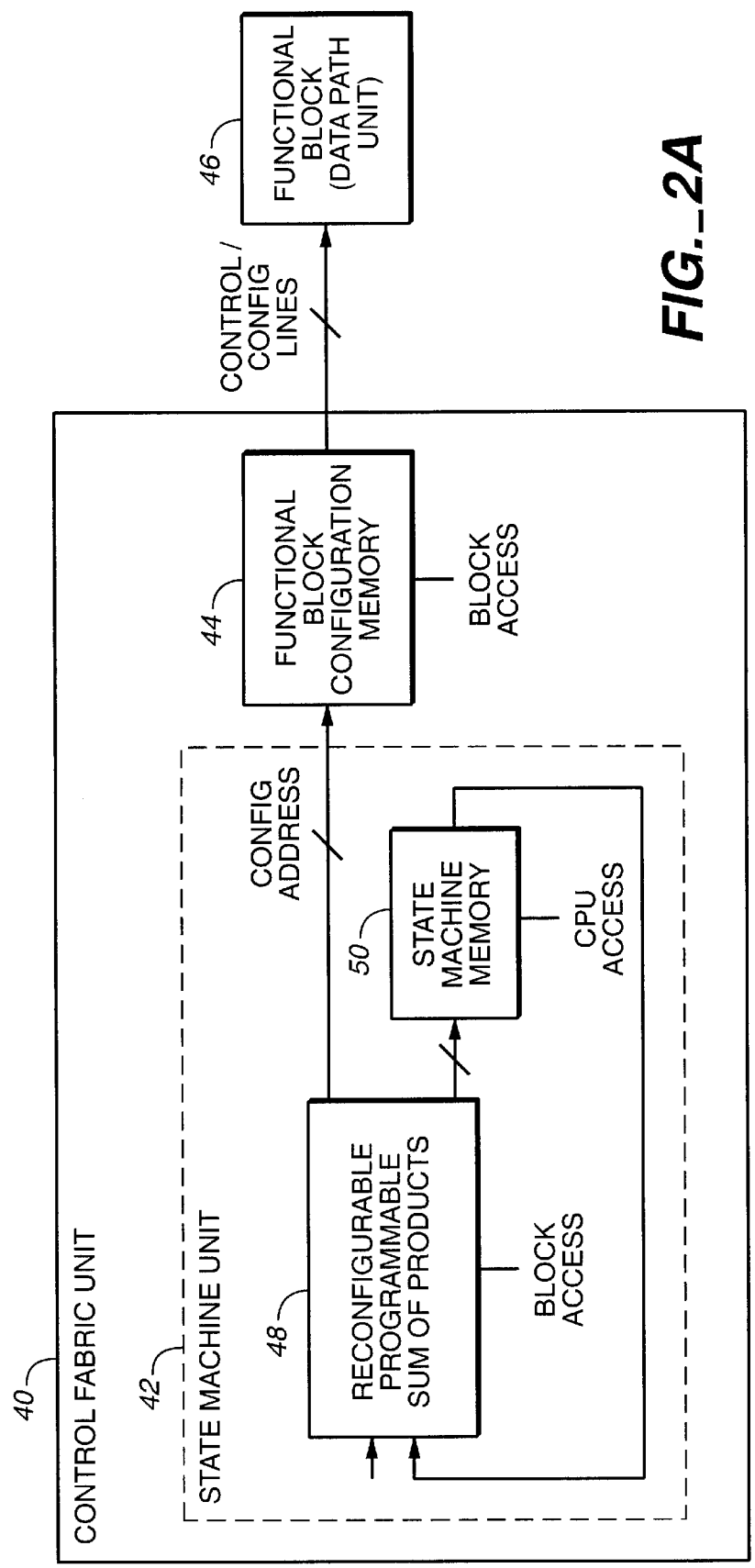
FIG._2A

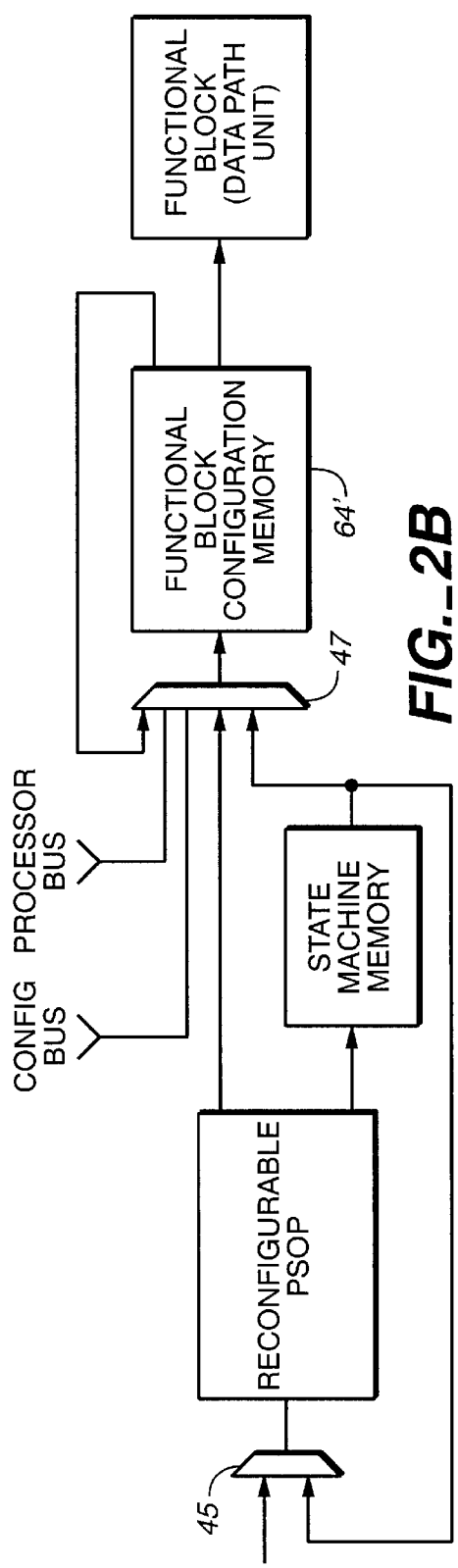
FIG._2B
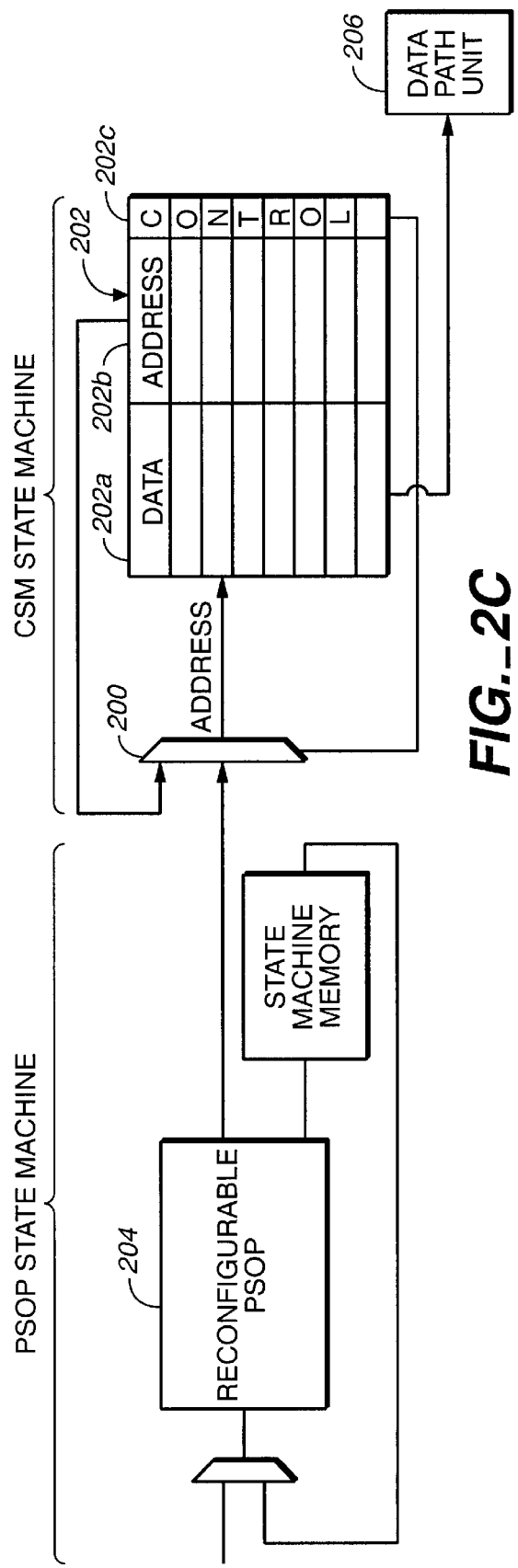
FIG._2C

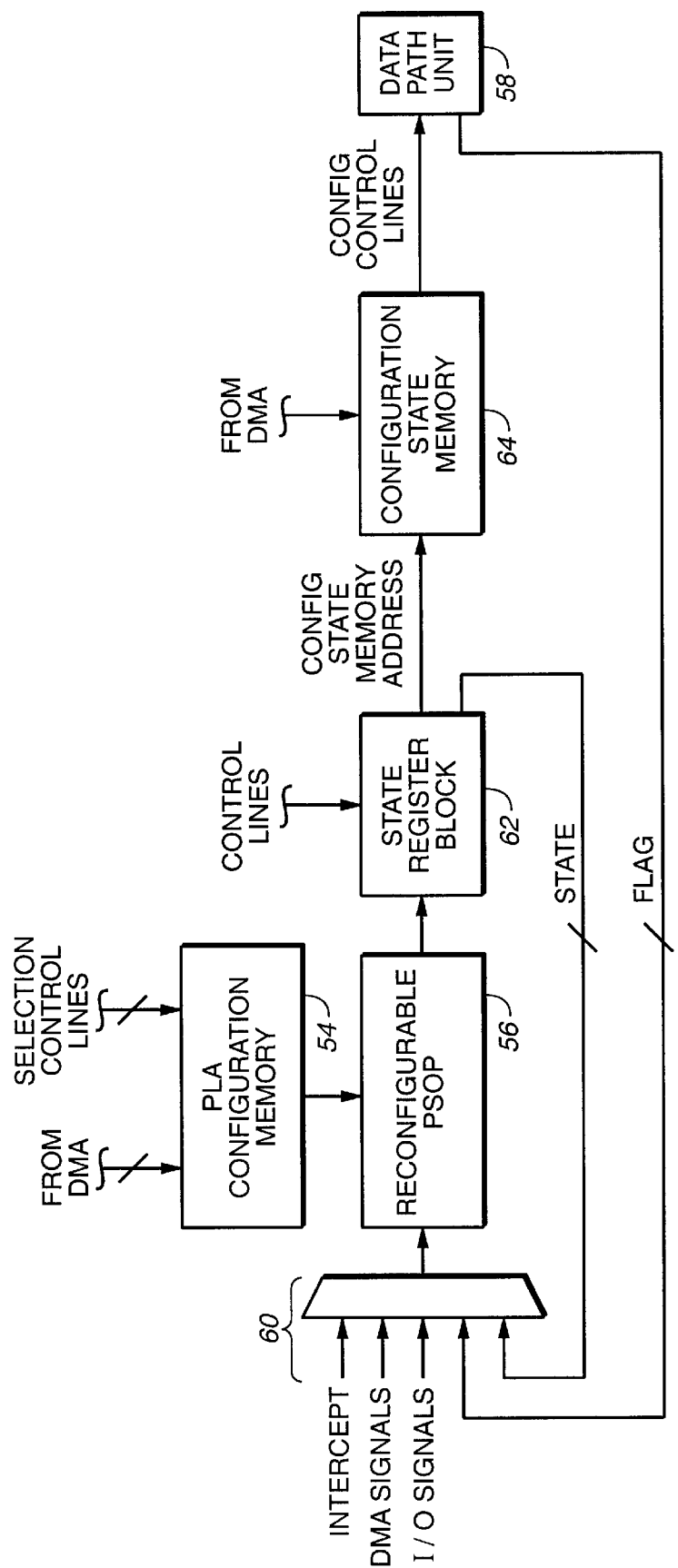
FIG._3A

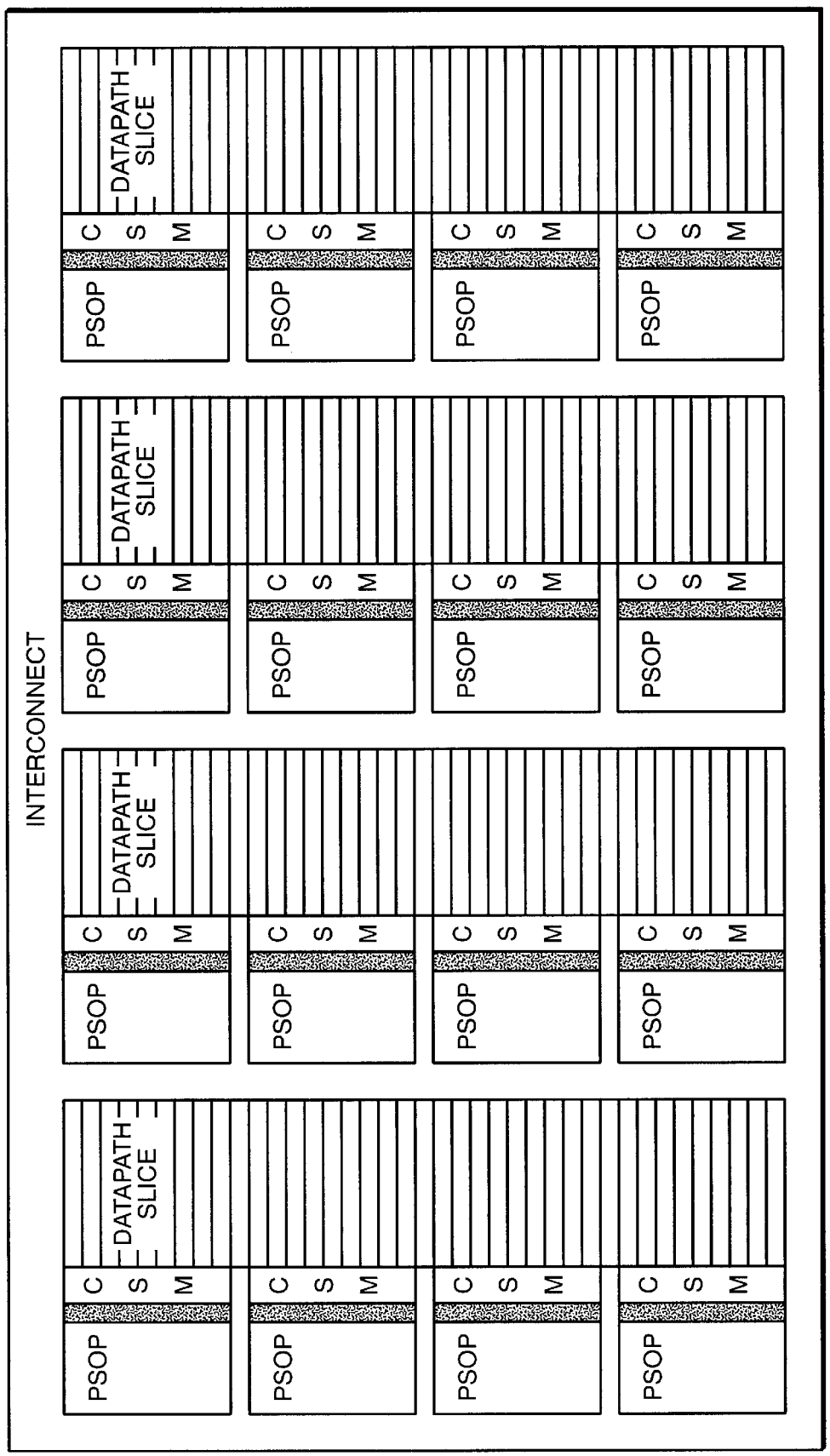
FIG._3B

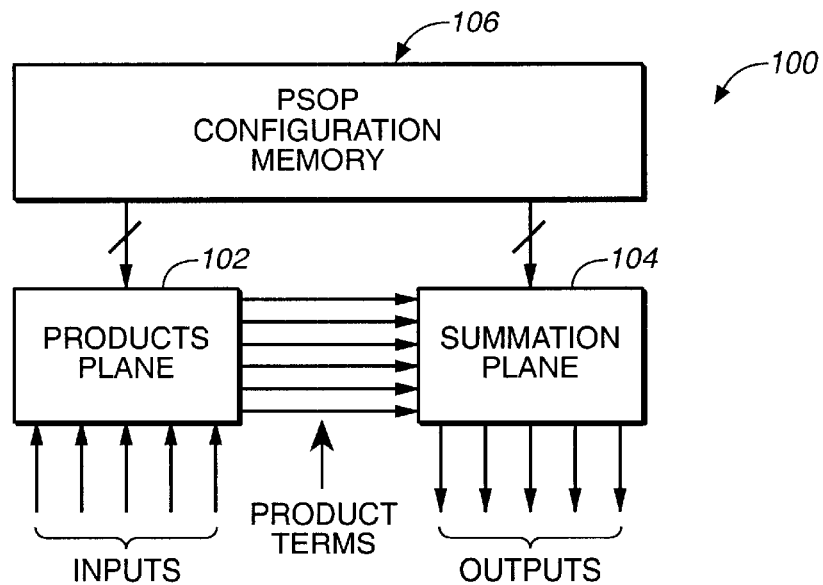
FIG._4A
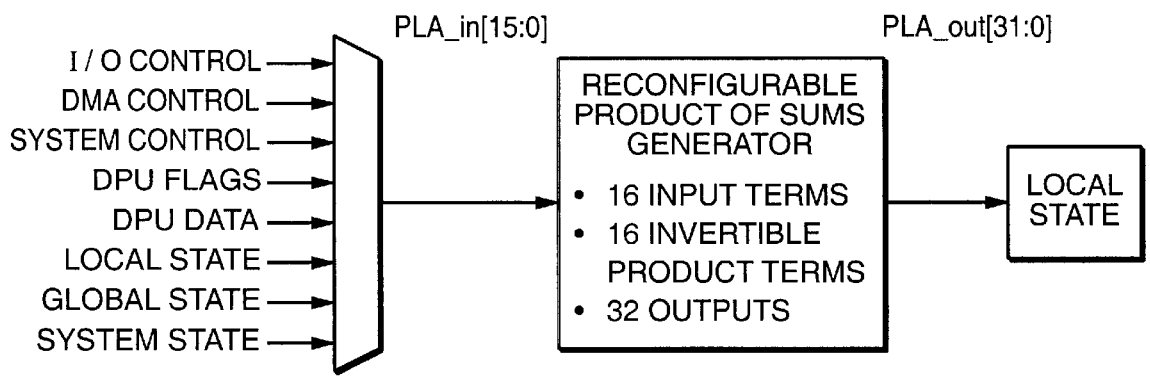
FIG._5

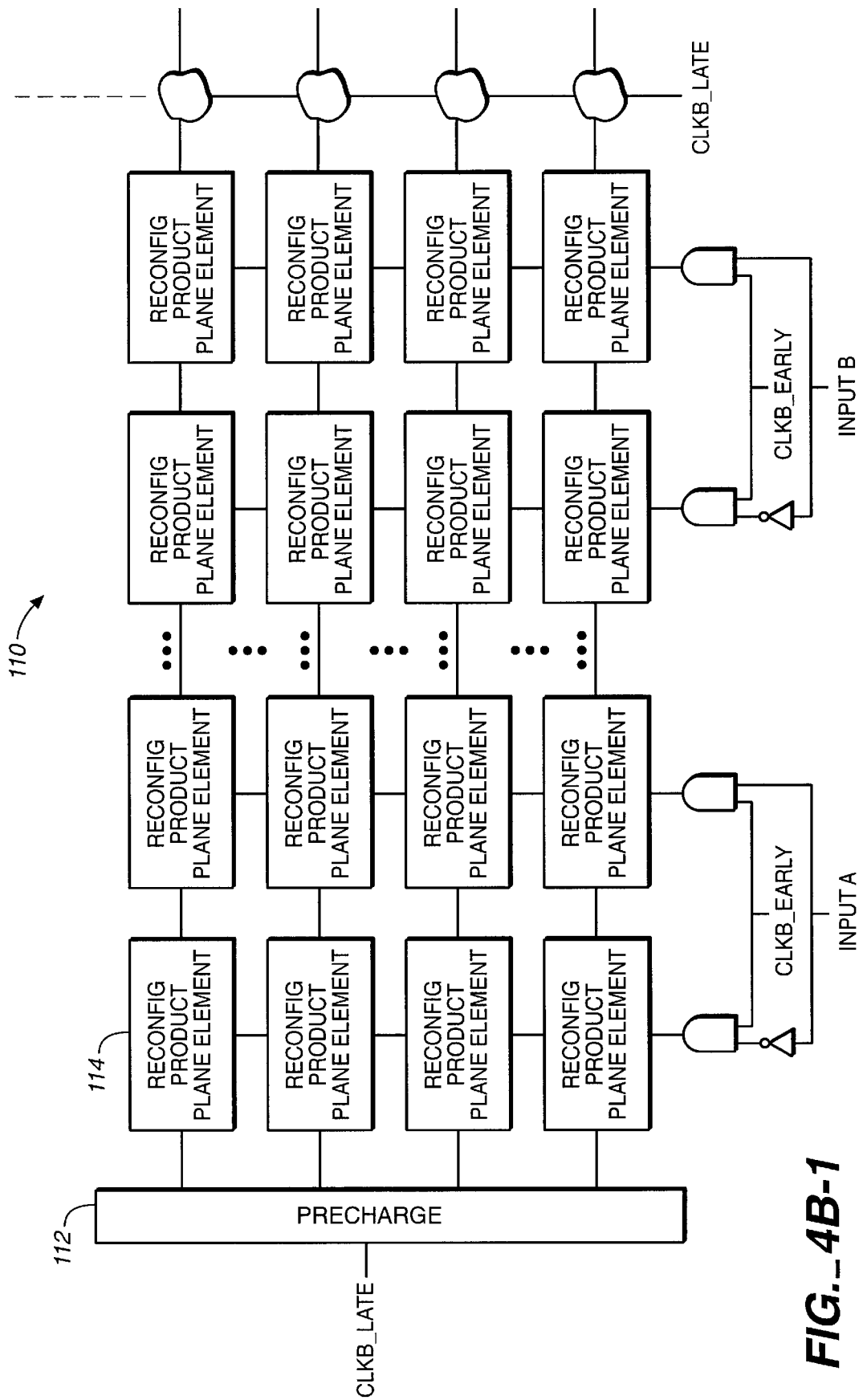
FIG._4B-1

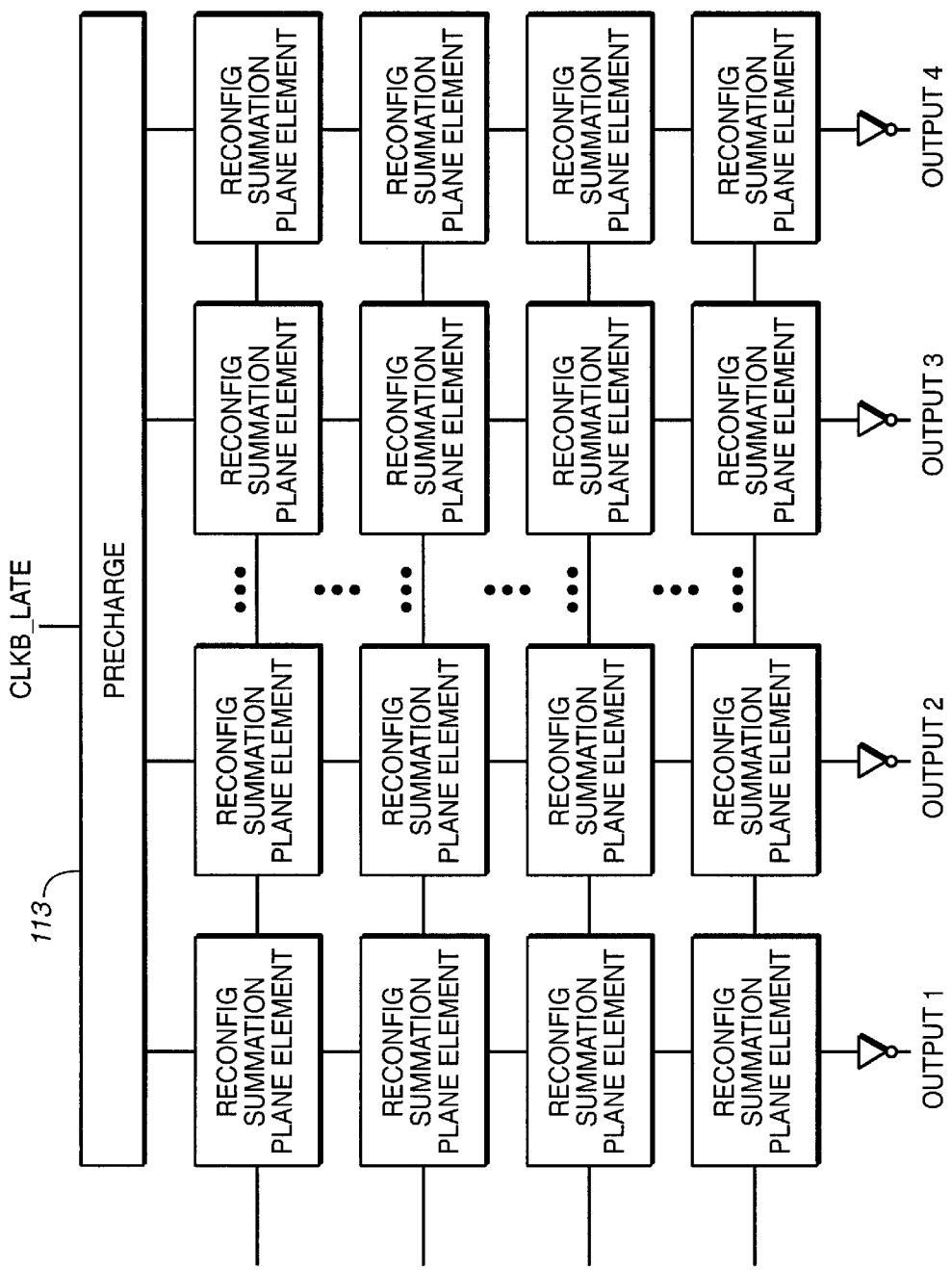
FIG._4B-2

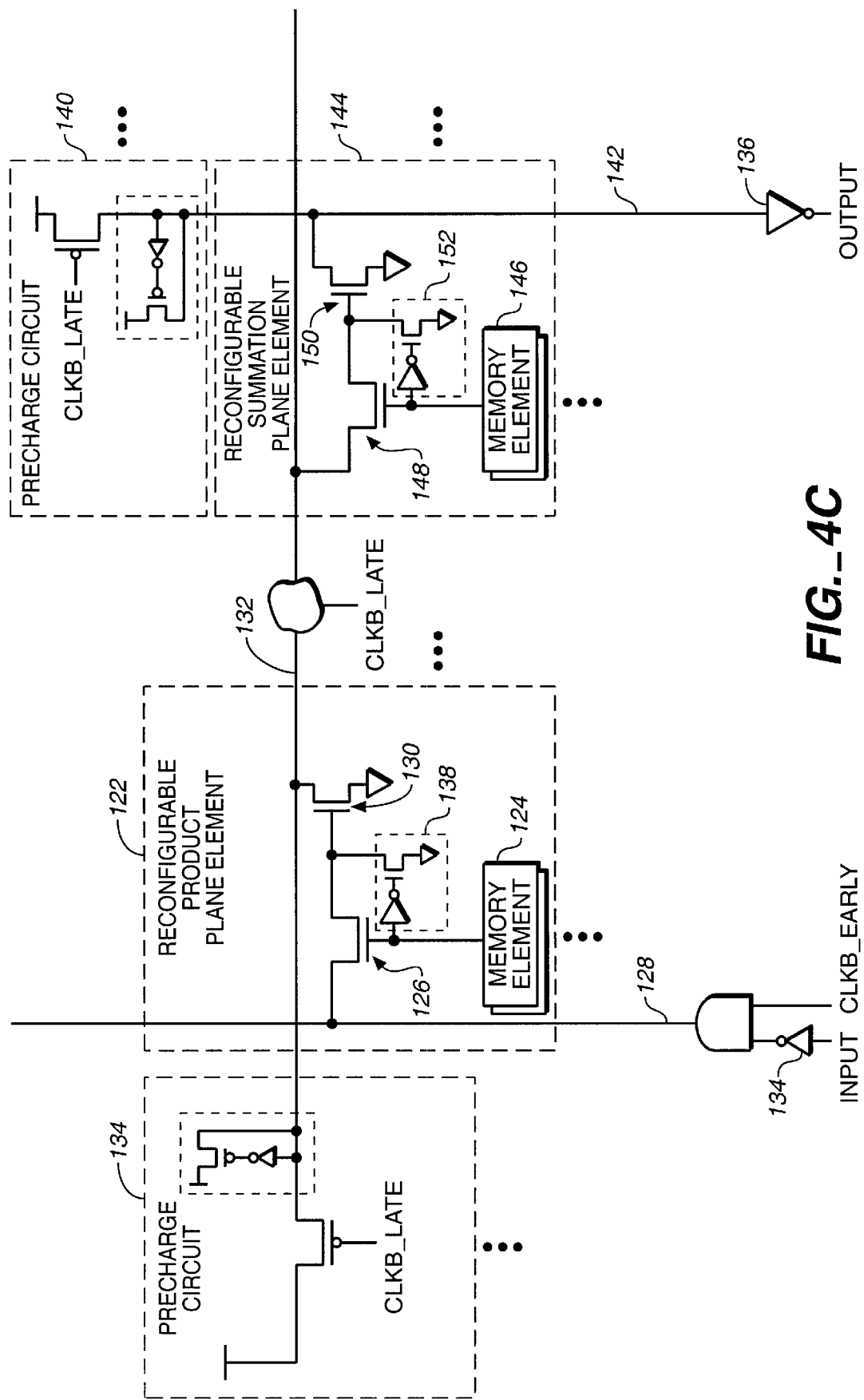
FIG._4C

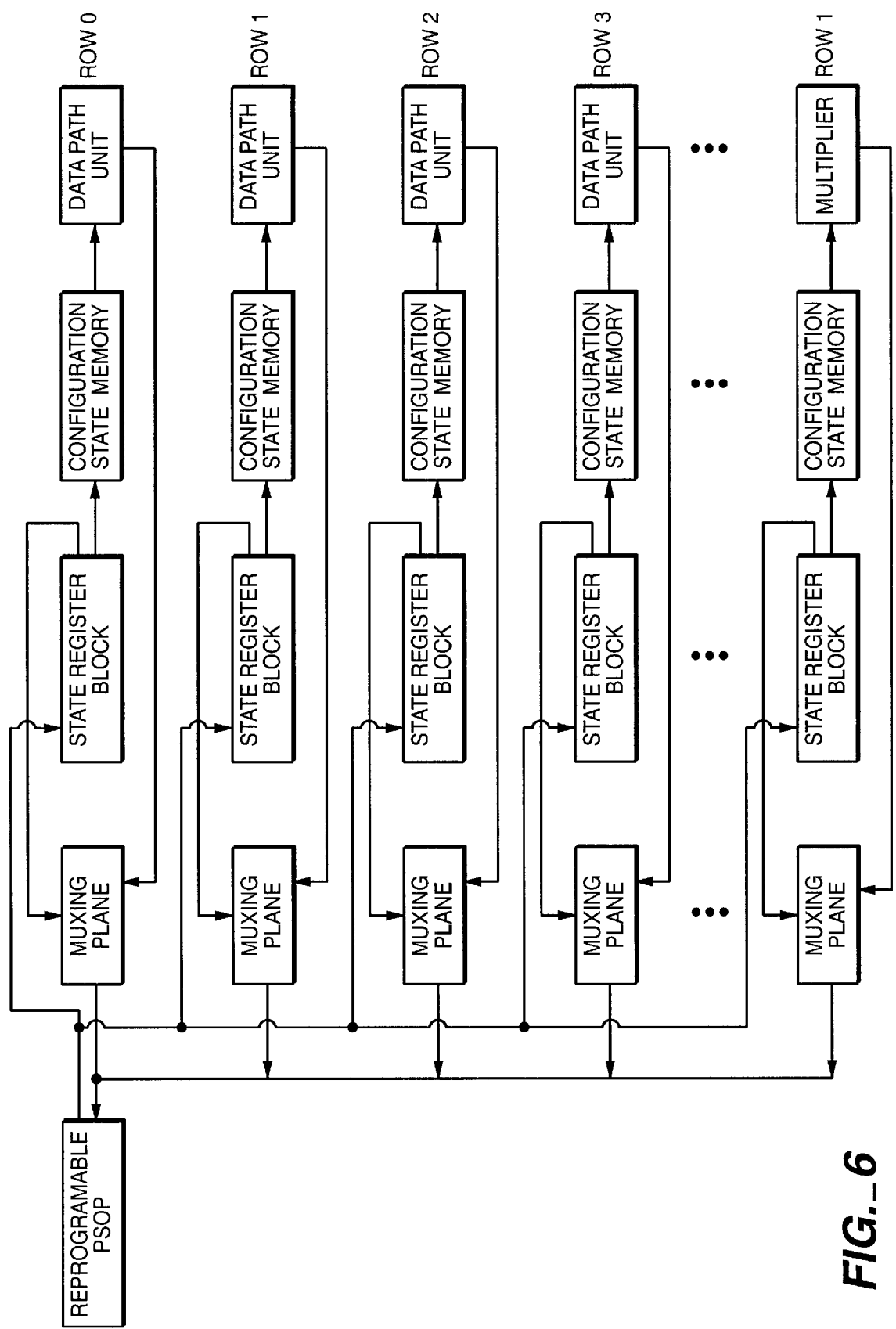
FIG._6

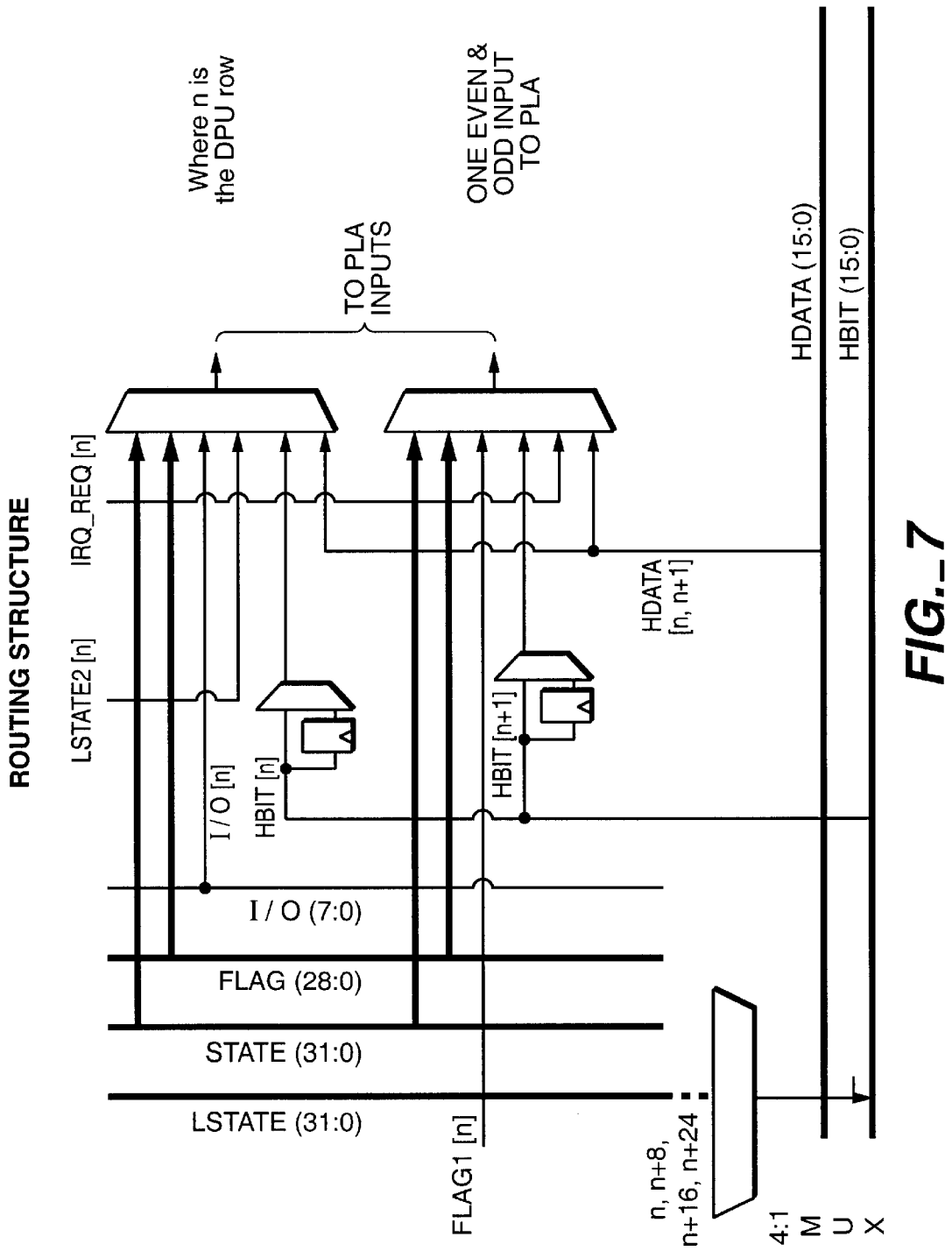
FIG._7

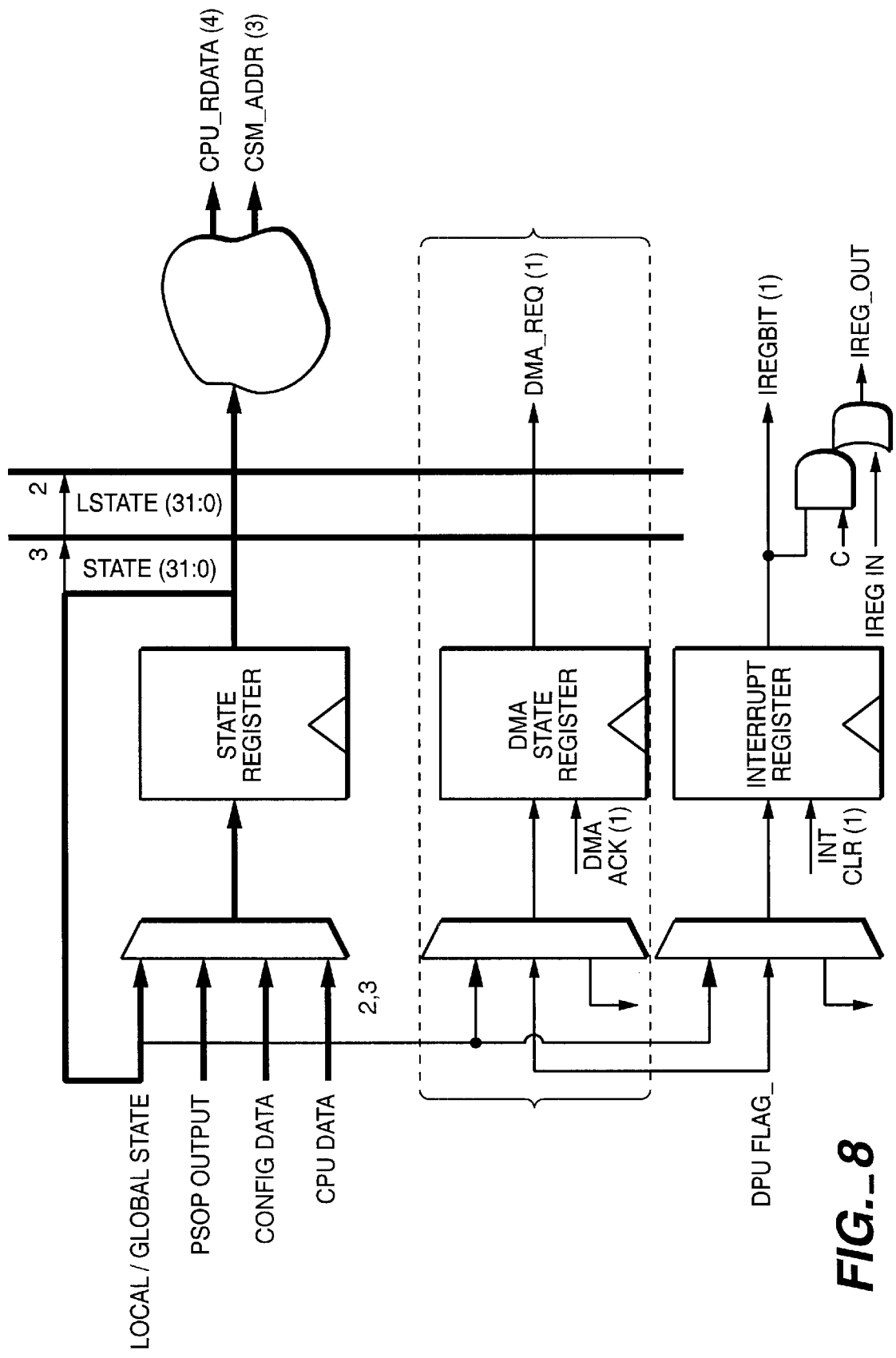
FIG._8

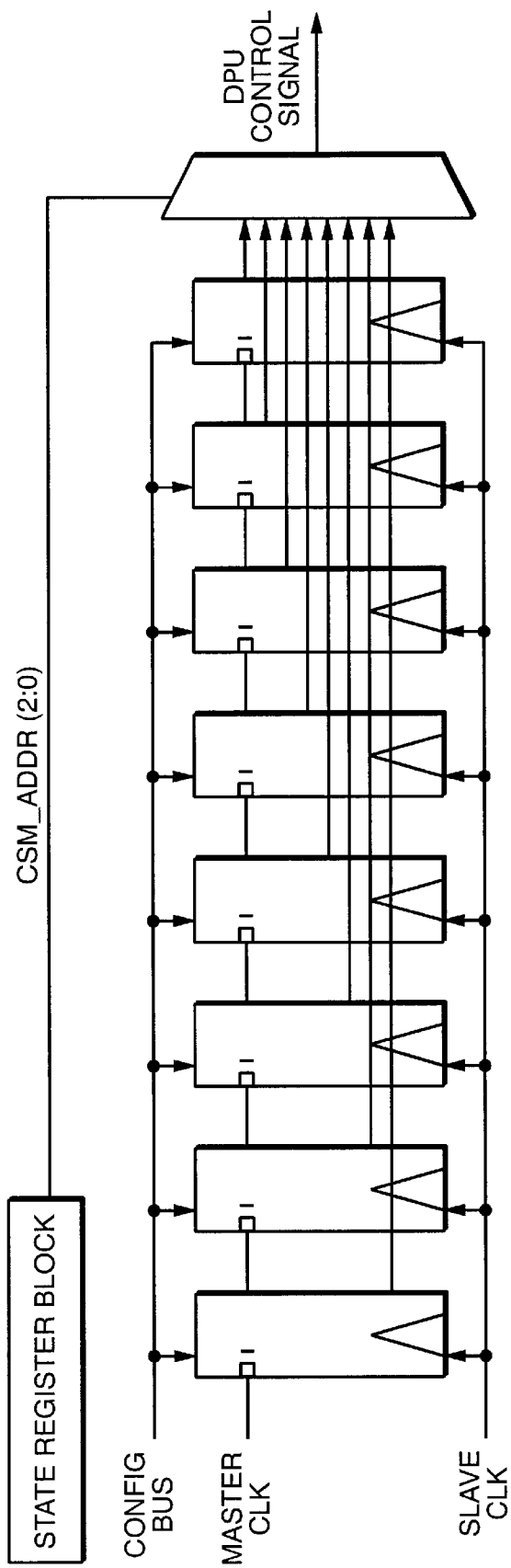
FIG._9A
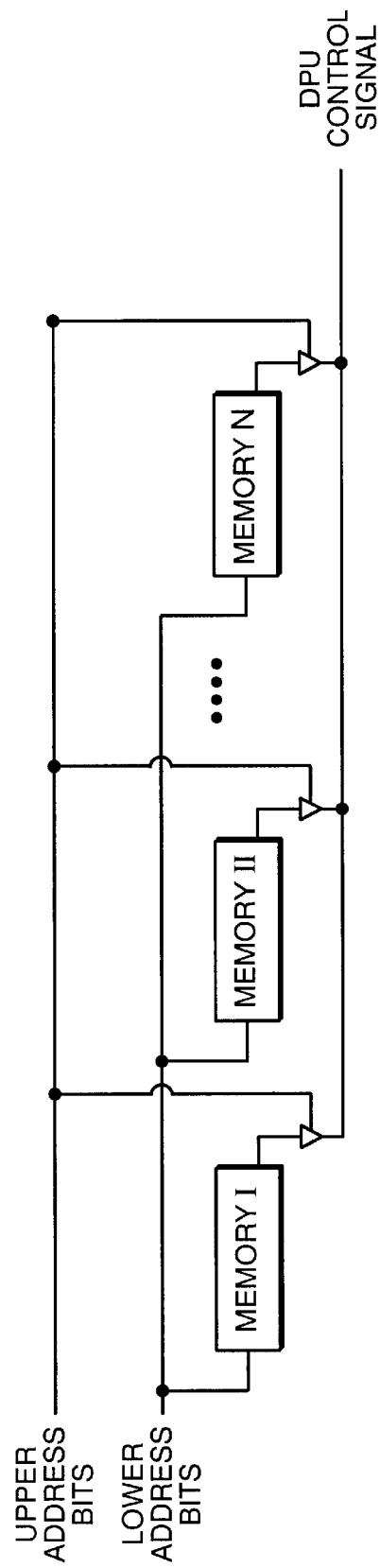
FIG._9B

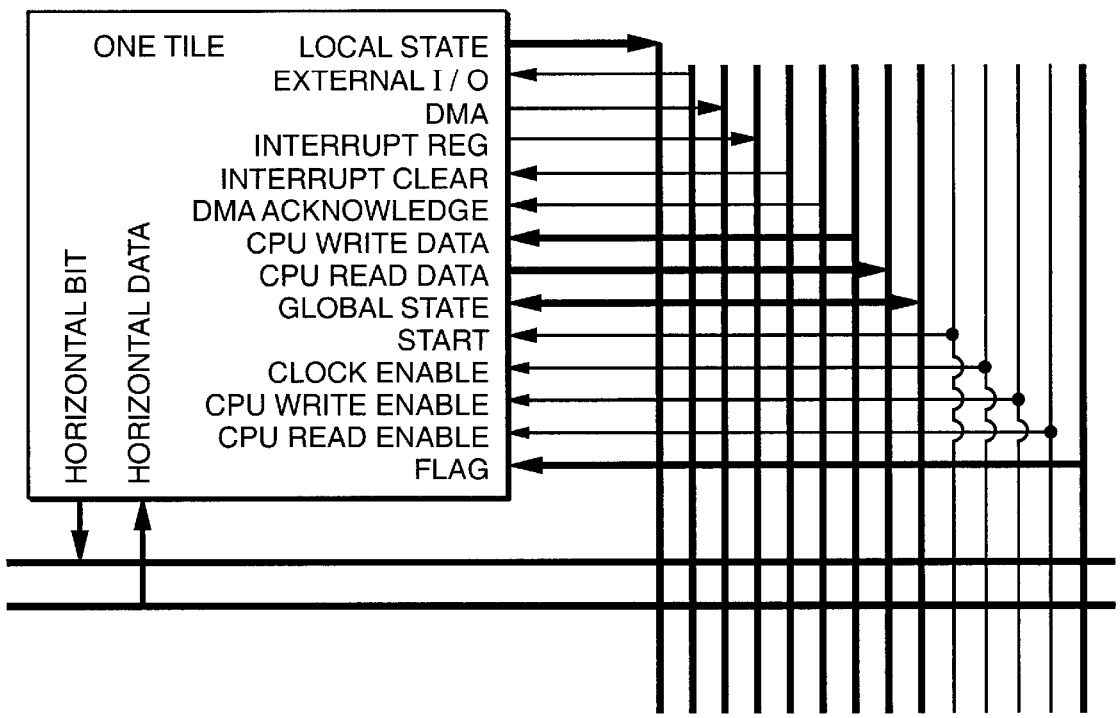
FIG._10
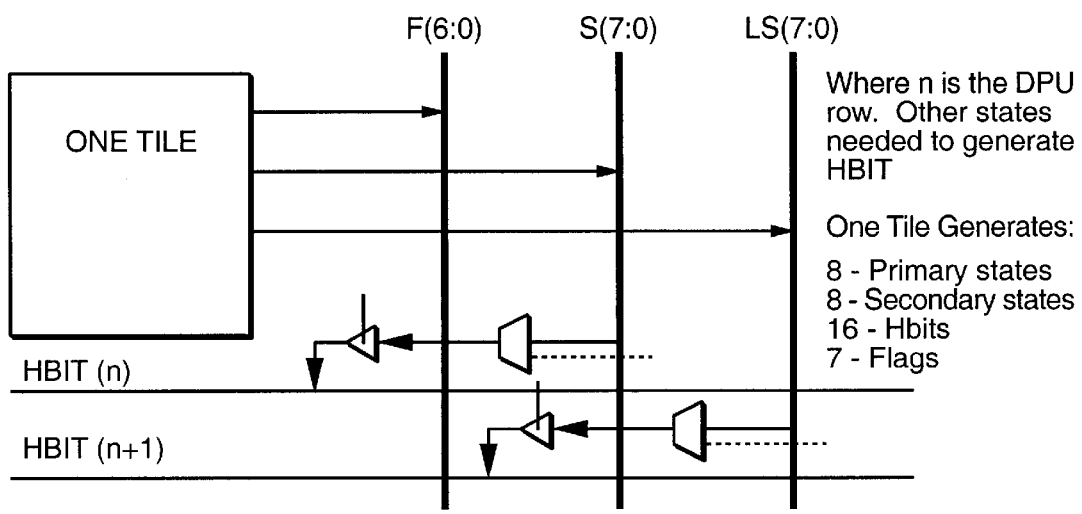
FIG._14

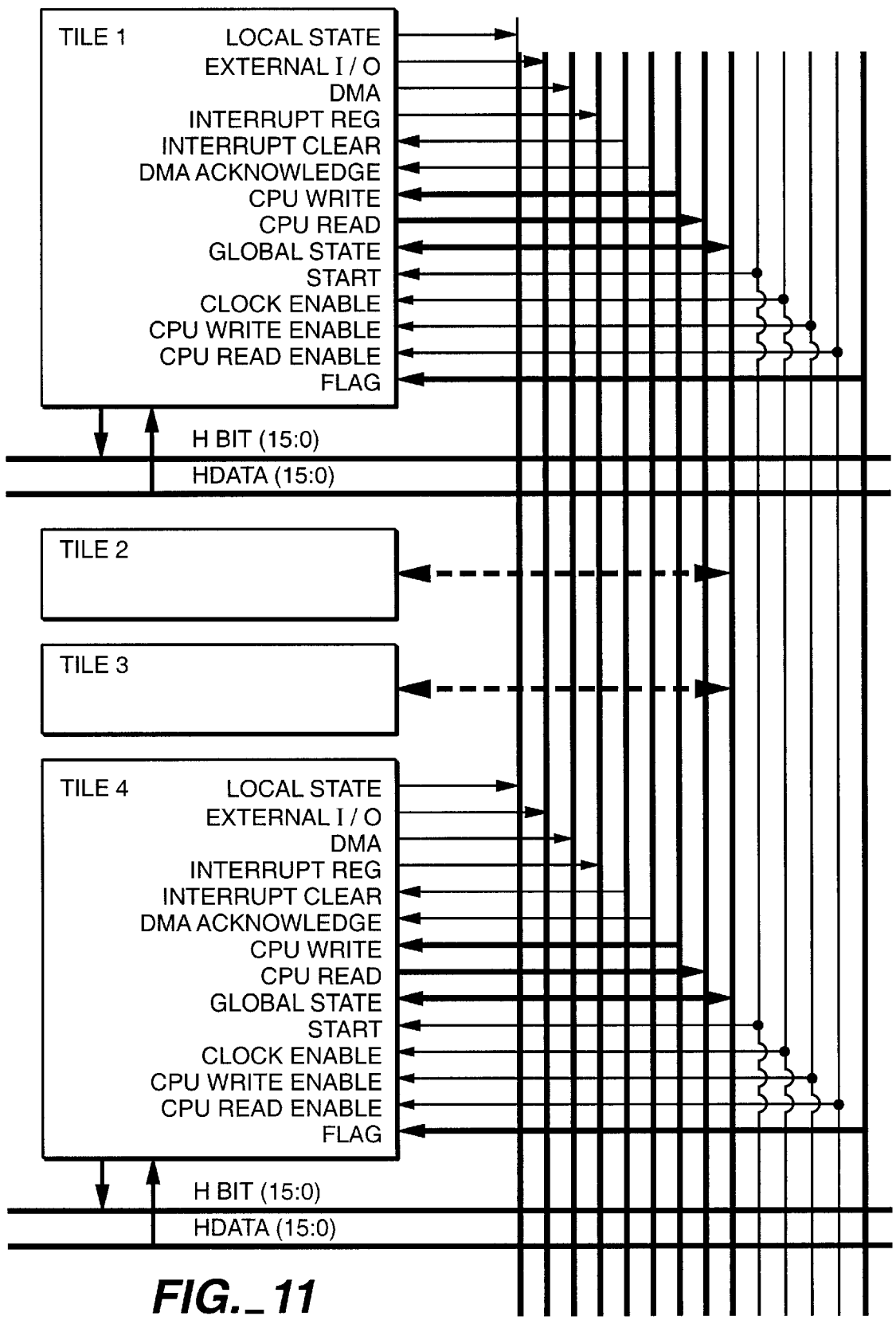
FIG._11

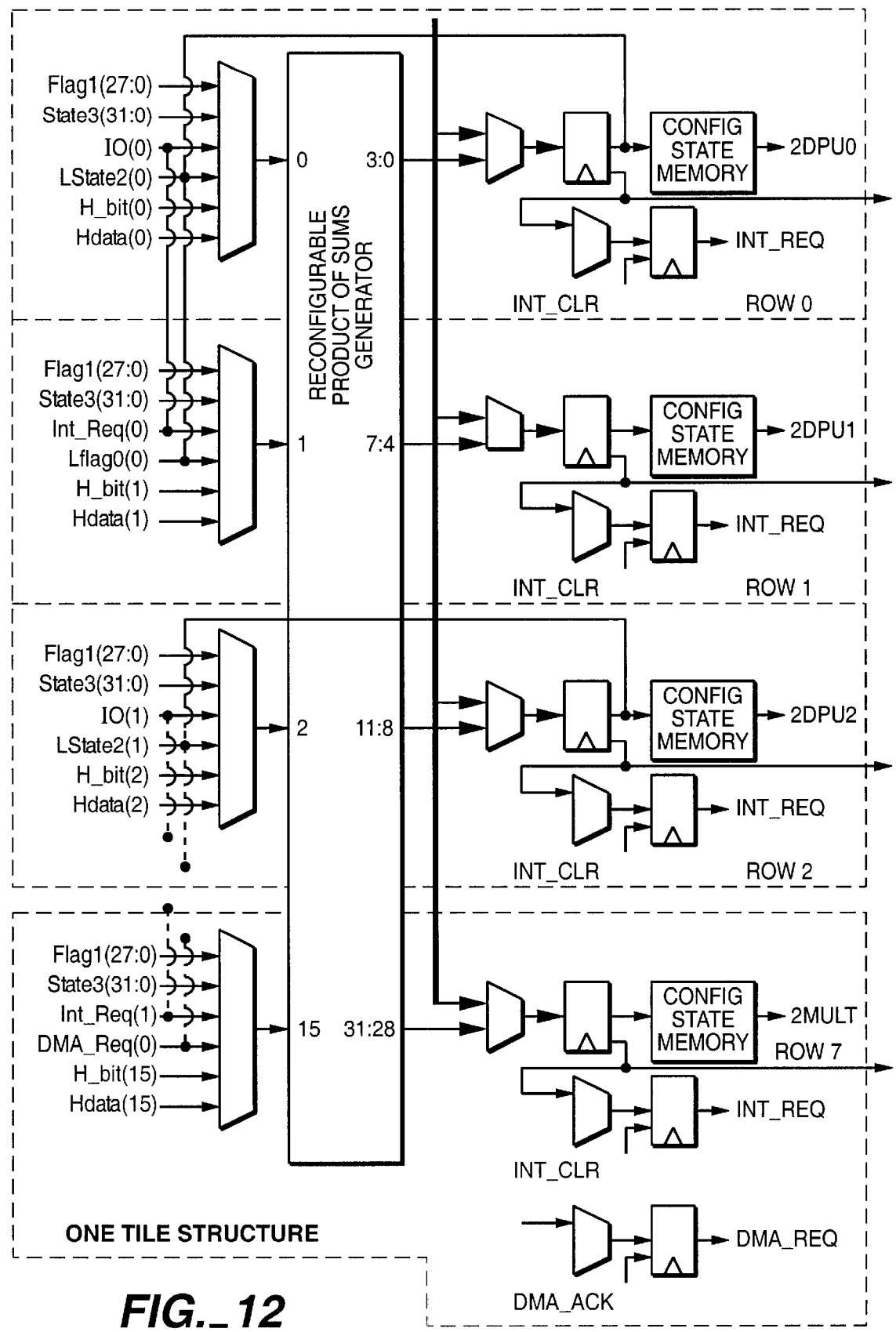
FIG._12

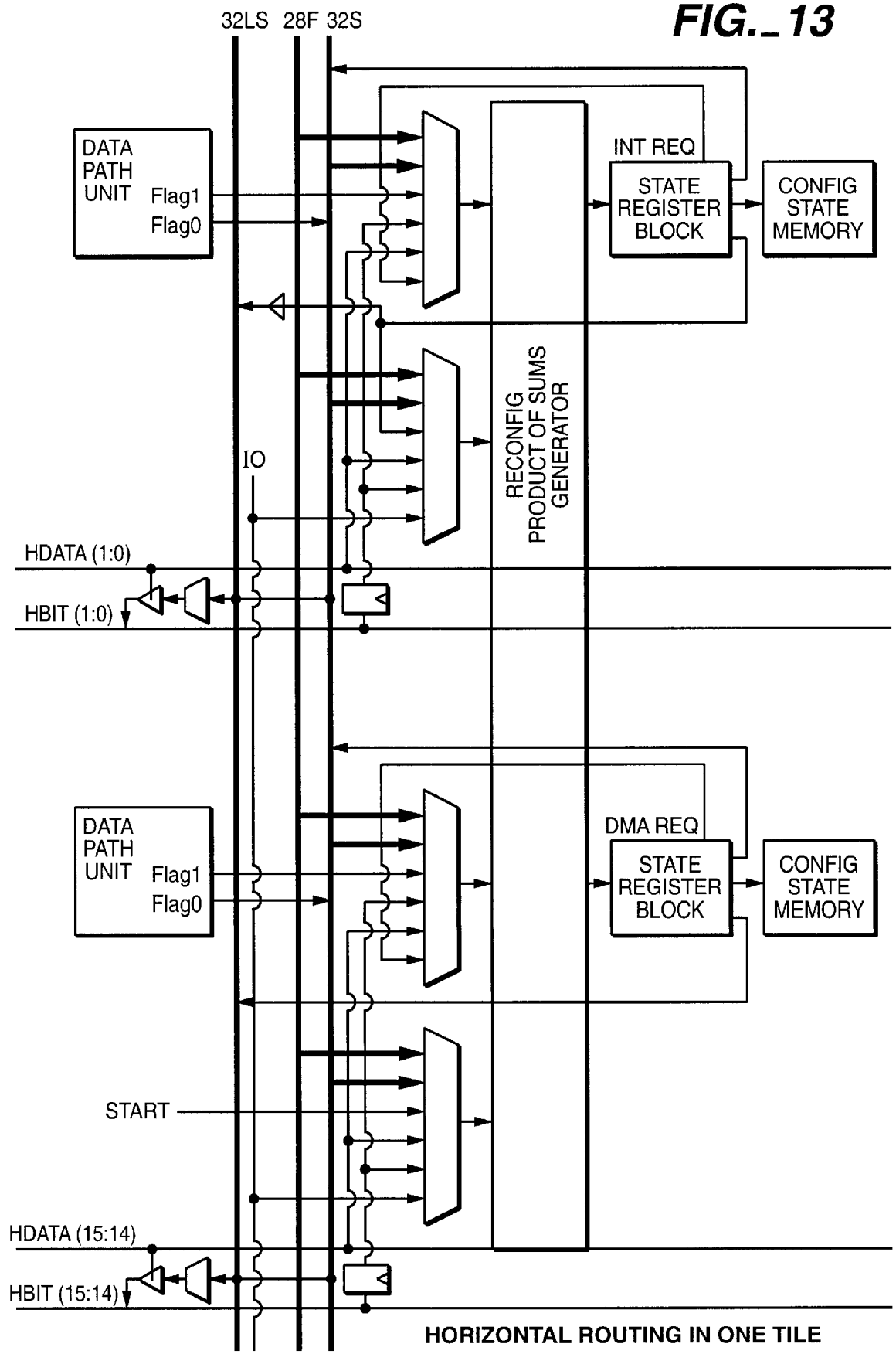
FIG._13

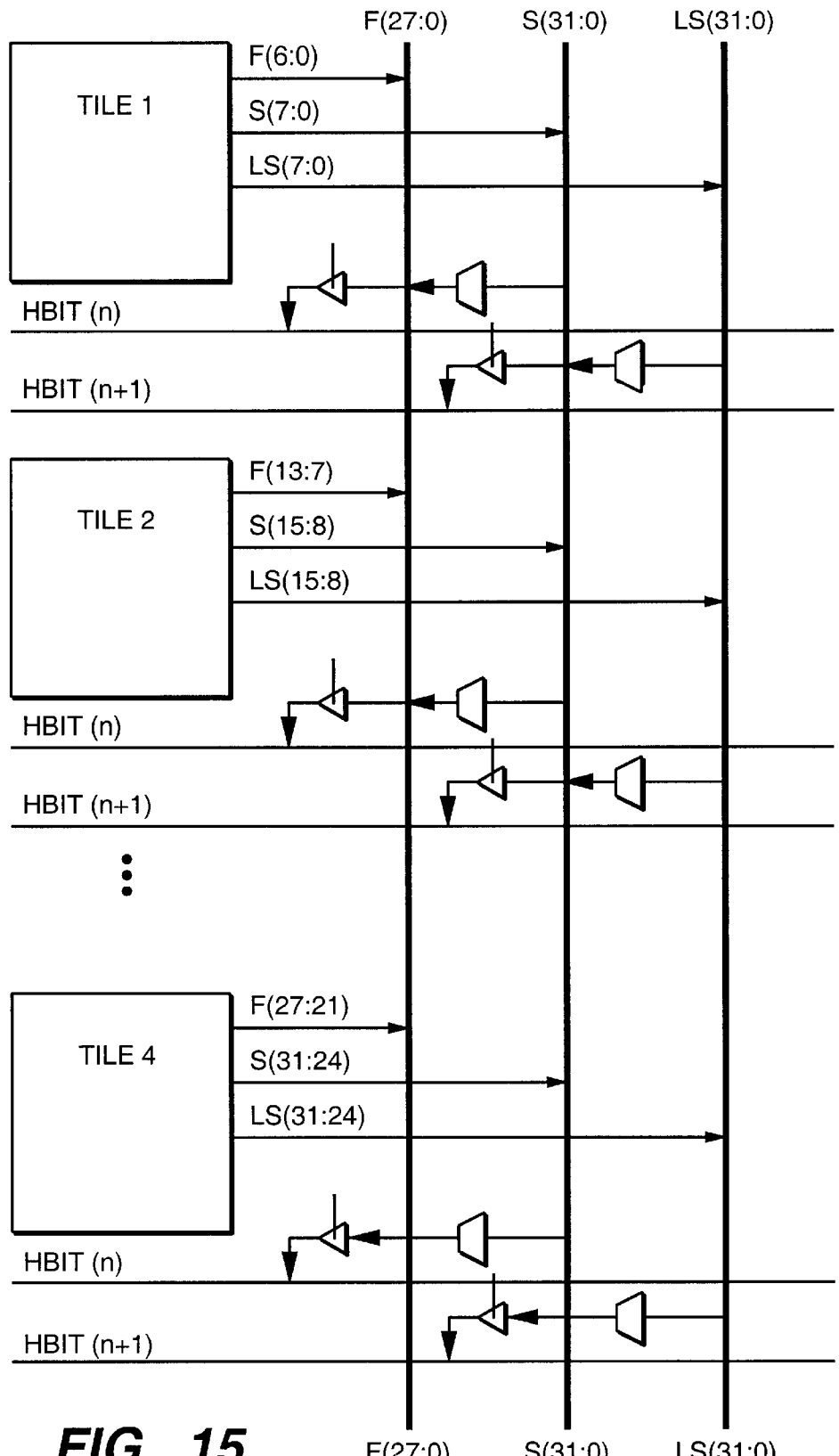
FIG._15

CONTROL FABRIC UNIT INCLUDING ASSOCIATED CONFIGURATION MEMORY AND PSOP STATE MACHINE ADAPTED TO PROVIDE CONFIGURATION ADDRESS TO RECONFIGURABLE FUNCTIONAL UNIT

BACKGROUND OF THE INVENTION

The present invention relates to reconfigurable logic chips.

Reconfigurable logic chips, such as field programmable gate arrays (FPGAs) have become increasingly popular. Such chips allow logic to implement different circuits at different times.

FPGAs are being increasingly used because they offer greater flexibility and shorter development cycles than traditional Application Specific Integrated Circuits (ASICs) while providing most of the performance advantages of a dedicated hardware solution.

One growingly popular use of FPGAs is referred to as reconfigurable computing. In reconfigurable computing, hardware logic functions are loaded into the FPGA as needed to implement different sections of a computationally intensive code. By using the FPGAs to do the computational intensive code, advantages are obtained over dedicated processors. Reconfigurable computing is being pursued by university researchers as well as FPGA companies.

Many FPGAs implement logic using lookup tables with feedback. These systems tend to be slow and inefficient especially for reconfigurable computing uses. It is desired to have an improved reconfigurable chip for reconfigurable computing.

SUMMARY OF THE PRESENT INVENTION

The present invention concerns a reconfigurable chip in which the control and data paths are separated. In a reconfigurable computing environment, the control is the circuitry to set up the reconfigurable functional units. The data path is the path of the data through the different functional units.

By separating the control and the data path functions, the two systems can be separately optimized. For example, in the data path, the data typically moves linearly from one functional block to the next functional block. Interconnections of the data paths tend to have large numbers of short connections for a relatively large data groups. On the other hand, control systems tend to require fewer interconnections typically using cross-shaped or diagonal connections. The control interconnections tend to be random in nature. They are used to implement state machines and logic for decision management.

In a preferred environment of the present invention, control units include a state machine unit and a functional block configuration memory. Some output data bits from the state machine unit are sent to the functional block configuration memory as a configuration addresses. This configuration address is used by the functional block configuration memory to produce a configuration for the functional blocks (data path units) within the data path portion of the logic system.

This arrangement has a number of advantages. The functional block configuration memory preferably, for maximum efficiency, has a small number of address bits and a relatively large number of configuration lines. The configuration lines effectively produce the desired function for the functional blocks. Examples of functions implemented by the data path unit include add, subtract, shift, and compare. Since only a few bits are used for the address sent to the functional block configuration state memory, the sequencing state machine can be kept relatively small. The use of the state machine unit has the advantage that the state machine is very dense with a large number of interconnections. In a preferred environment, the state machine includes a reconfigurable programmable sum of products (PSOP) generator. In one embodiment, more than one functional block and functional block configuration memory can be connected to a single reconfigurable sum of product generator.

In a preferred embodiment, the reconfigurable sum of products generator stores multiple configurations that can be selectively loaded into the programmable sum of products generator. Data from the functional units can also be used to switch the configuration of the reconfigurable PSOP generator. By having a number of different configurations local at the chip, the operations done by the functional units can be quickly changed. This is particularly advantageous for some applications such as packet switching. For example, in a packet processing application, bits in certain fields of the packet can be interpreted by a functional unit implementing a compare function. If the bits are a certain value, the functional unit can produce a signal which causes a different configuration to be loaded into the reconfigurable programmable sum of products generator, thus implementing a different state machine. The system can continue operating without requiring a time-consuming load of a state machine configuration from an external memory when a backup configuration is stored locally.

Another embodiment of the present invention concerns the use of the reconfigurable programmable sum of products generator. The reconfigurable programmable sum of products generator structure is dense and highly interconnected and thus is advantageous for use in the control fabric of a reconfigurable chip. Additionally, by using a number of reconfigurable planes for the reconfigurable programmable sum of products generator, the programmable sum of products generator configurations can be quickly switched.

BRIEF DESCRIPTION OF THE DRAWINGS

FIG. 1 is a diagram of a reconfigurable chip of one embodiment of the present invention.

FIG. 2A is a diagram illustrating an overview of one embodiment of the system of the present invention.

FIG. 2B is a diagram of an embodiment of the present invention using multiplexers.

FIG. 2C is a diagram of an embodiment in which the configuration state memory forms a state machine separate from the PSOP state machine.

FIG. 3A is a digram illustrating the system of one embodiment in the present invention.

FIG. 3B is a digram illustrating the floor plan of control fabric units and data path units.

FIG. 4A is a diagram of a reconfigurable programmable sum of products generator of one embodiment of the present invention.

FIG. 4B is one embodiment of a reconfigurable programmable sum of products generator of one embodiment of the present invention.

FIG. 4C is a diagram of one embodiment of a reconfigurable programmable sum of products generator of the present invention.

FIG. 5 is a diagram illustrating one embodiment of the control fabric units of the present invention.

FIG. 6 is a diagram illustrating the use of a single programmable sum of products generator with multiple configuration memories.

FIG. 7 is a diagram illustrating one embodiment of a muxing plane for use with the control fabric unit of the present invention.

FIG. 8 is a diagram illustrating a state register block for use with one embodiment of the present invention.

FIG. 9A is a diagram illustrating a detail of the configuration state memory used with one embodiment in the present invention.

FIG. 9B is a diagram illustrating a detail of another embodiment of a configuration state memory present invention.

FIG. 10 is a diagram illustrating the routing of control and interface signals for one tile used in the present invention.

FIG. 11 illustrates the slice structure and interface signals for use in one embodiment in the present invention.

FIG. 12 is a diagram that illustrates the tile structure for one embodiment of the present invention.

FIG. 13 is a diagram that illustrates the horizontal routing structure for one tile of an embodiment of the present invention.

FIG. 14 is a diagram that illustrates the horizontal tile routing for one embodiment of the present invention.

FIG. 15 is a diagram that illustrates the horizontal input mux for one tile used with embodiment of present invention.

DETAILED DESCRIPTION OF THE PREFERRED EMBODIMENT

FIG. 1 illustrates an overview of one embodiment of a configurable chip that uses the control fabric unit of the present invention. The reconfigurable chip 20 is connected to an external memory unit 22. The reconfigurable chip 20 includes the control fabric units 24, central processing unit 26 and the reconfigurable fabric slices 28. In a preferred embodiment, the reconfigurable fabric slices include a number of data path units which act as the functional blocks for the data in the reconfigurable computing environment. FIG. 1 shows separated data path units and control fabric units, but, in a preferred embodiment, these units are interspersed together as shown in FIG. 3B. The control fabric units 24 provide control signals and data to implement a number of functions with the data path units. A data memory access (DMA) controller 30 provides configuration data to the reconfigurable control and data units. The DMA controller 30 and the CPU 26 are connected to the bus 32. Data from the external memory 22 is placed on the bus 32 using the memory controller 34.

An example of a reconfigurable chip for use with the present invention is disclosed in the patent application "An Integrated Processor and Programmable Data Path Chip For Reconfigurable Computing," Ser. No. 08/884,380, filed Jun. 27, 1997, incorporated herein by reference.

FIG. 2A is a simplified overview of one embodiment of the control fabric unit 40 used with the present invention. Control fabric unit 40 includes a state machine unit 42 and a functional block configuration memory 44. The state machine unit 42 provides configuration addresses which are sent to the functional block configuration memory 44. The functional block configuration memory 44 then provides the configuration to a functional block 46. In a preferred embodiment, a few configuration address bits are used by the functional block memory 44 to access a much greater number of configuration bits. For example, in one embodiment, three configuration address bits are provided which are used by the functional block configuration memory 44 to provide around fifty (50) configuration lines provided to the functional block 46. The functional block configuration memory 44 stores multiple configurations for the functional block 46.

In one embodiment, the state machine 42 is comprised of a reconfigurable programmable sum of products (PSOP) device, preferably a PLA. The reconfigurable reprogrammable PSOP 48 preferably has a number of configuration planes to set up the programmable sum of products generator into different configurations. In one embodiment, an active (foreground) plane and a background plane are used. Details of a reconfigurable PSOP are described below with respect to FIGS. 6A, 6B and 6C. The state machine 42 also contains state machine memory registers 50. The state information is fed back into the programmable sum of products generator 48.

The configuration control lines are sent to the functional block 46. In a preferred embodiment, the functional block 46 is a data path unit which can be configured a number of ways. The data path unit have a number of elements such as registers, adders, output registers, and multiplexers, which are configured by the configuration lines sent from the functional block configuration memory so that the data path unit performs a predetermined function.

FIG. 2B shows an embodiment using a multiplexer 45 at the input to the reconfigurable PSOP and a multiplexer 47 at the input to the configuration memory 64'. The multiplexer 47 may use the output of the configuration memory 64' as an input so that the configuration memory 64' is part of a state machine. Details of one such embodiment is shown in FIG. 2C.

FIG. 2C shows multiplexer 200 that has inputs from the output of configuration state memory 202 and from the reconfigurable PSOP 204. Each line of the configuration state memory 202 has a configuration data field 202a, a next address field 202b and a control bit field 202c. The control bit field determines what input is selected by multiplexer 200. When the PSOP state machine input is selected the address from the PSOP state machine is used to select the data to go to the data path unit 206.

When the CSM state machine is selected the address in address field 202b is used as the next address to the control state memory 202. The system of FIG. 3C thus provides two compatible state machines which can allow a relatively complicated combined state machine to be stored on the reconfigurable chip.

FIG. 3A is a diagram that illustrates one embodiment of the configuration fabric unit of the present invention. The reconfigurable programmable sum of products generator includes an interspersed reconfigurable PSOP configuration memory 54.

Control select lines allows the selection of the different configurations. In one embodiment, both a current configuration and backup configuration can be stored local to the programmable sum of products generator. This allows the system to quickly switch from one operation to another. The configurations are preferably selectable by control lines or under additional selection lines from the CPU or based on the data path results. Details of one example of such a system are given in the patent application, "Method and System of Data Memory Streaming," Ser. No. 09/343,477, incorporated herein by reference. The data path units can be configured such that the result of a calculation in the data path unit determines whether another configuration is to be loaded into the reconfigurable logic. If the configuration is to be loaded the data path unit can send a signal to the DMA controller to handle the configuration loading.

The data path unit 58 is one example of a functional block that can be used with the present invention. The input to the reprogrammable programmable sum of products generator 56 is sent to a multiplexer unit 60. These inputs can include the state information from the state register block 62 as well as external inputs from sources such as the data path units, central processing units or external pin I/O. The configuration address is sent to the data path configuration memory 64. The data path configuration memory 65 is loadable from the external storage typically in a DMA process.

The system of the present invention can be used for a variety of applications. For example, in packet processing applications, data in one field of a packet determines how the data in another field is evaluated. A data path unit can do a compare upon one field to determine whether to use another configuration to further interpret the packet. This additional configuration can be a quickly loaded backup configuration. In many cases, the data path configuration memory 64 need not be modified since larger number of control state memory slots are available than are needed for a PSOP state machine configuration. This can reduce the number of downloads external to the chip and thus increase the speed of the system.

In a preferred embodiment, software can allocate the different configurations for the data path configuration memory 64 so that the functional block can implement different functions such as shift, add, compare, select, or the like. The computer software can optimize the functional configurations which are to be stored in the data path configuration memory increasing the power of the system of the present invention. In one embodiment, the data path configuration memory and the programmable sum of products generator configuration memory are arranged such that memory can be loaded from the external memory in the background while the system concurrently operates using another different configuration.

The state machine configurations and the data path configurations are calculated by a compiling computer to determine which function needs to be implemented for a given net list. As described above, the configurations stored in the configuration state memory 64 can be optimized to provide the specific functions needed in a given network.

FIG. 3B shows four slices each slice having four tiles, each tile having a single PLA and a number of configuration state memories (CSM). As described below, each programmable sum of products generator can have a number of associated CSM units.

FIGS. 4A, 4B, and 4C illustrate one embodiment of a programmable sum of products generator for the present invention. FIG. 4A illustrates a reconfigurable programmable sum of products generator 100. The reconfigurable programmable sum of products generator 100 is comprised of a Product plane 102, a Summation plane 104 and a PSOP generator configuration memory 106. The inputs to the programmable sum of products generator go to the Product plane 102. The Product plane produces products terms which are then sent to the Summation plane 104. The Summation plane 104 uses the product terms to produce the outputs. The programmable sum of products generator configuration memory 106 stores the configurations for the Product and Summation planes. As described below, this memory is in fact interspersed within the reconfigurable programmable sum of products generator. Conventional programmable sum of products generators are programmable in that the same fixed floor plan allows the chip designer to implement different logic functions at the IC chip design stage. By using memory elements in the programmable sum of products generator, the present invention is reconfigurable allowing configurations to be switched during chip operation.

FIG. 4B illustrates a reconfigurable programmable sum of products generator 110 of one embodiment of the present invention. This reconfigurable programmable sum of products generator is arranged as a dynamic PSOP generator using precharge circuits to precharge the product term lines and the output lines. The precharge circuitry 112 and 113 operates during a first portion of the clock. During a second portion of the clock, the product terms are evaluated and the output produced. The circuit uses Product and Summation plane elements. The Product and Summation plane elements, in a preferred CMOS embodiment, both implement a "NOR" function. By inverting the inputs to and outputs from the two "NOR" planes output terms equivalent to the outputs of a true AND-OR PLA can be produced. The plane elements are labeled as Product and Summation plane elements for ease of description. The "Product" and "Summation" plane elements can also operate in a full throughput mode as a non-dynamic array.

Each Product and Summation plane has an associated memory element which is part of the PSOP configuration memory. The associated memory element determines whether the Product plane element 114 and/or the Summation plane element 116 will be active.

FIG. 4C shows details of a reconfigurable programmable sum of products generator 120. The Product plane element 122 includes a memory element 124 connected to the gate of first transistor 126. When the first transistor 126 is on, the Product plane element connects input line 128 to the second transistor 130. If the memory element is zero, the first transistor 126 isolates the second transistor 130 preventing the input line 128 from affecting the product term line 132.

Product term 132 is precharged "high" using precharge circuitry 134 before the operation of the Product plane elements. If the memory element 124 provides a "one" and a "one" is provided on input line 128, the Product plane element 122 will cause the product term line 132 be grounded. If at least one Product plane element on product term line 132 is grounded, the product term output for line 32 is a "zero". If no Product plane element on product term line 132 is grounded, then the product term output on line 132 is a "one". In this way a NOR function is implemented.

The Product plane element 122 includes a protection circuit 138. Protection circuit 138 protects the chip when a memory element is switched from a "high" to a "low" value. When the memory element is switched from a "high" to a "low" value, it is possible that the gate of transistor 130 can be held "high" isolated by transistor 126. If this happens when the precharge circuit 134 is activated, a short between the power and the ground through the transistor 130 is formed. Such a short can permanently damage the chip due to the relatively large currents involved.

To prevent such damage, protection circuit 138 is provided. When the memory element 124 is switched to zero, protection circuitry 138 causes the gate of the transistor 130 to be grounded. This turns off transistor 130 and thus prevents a short through transistor 130 during the precharge period.

The Summation plane elements operate in a similar manner to the Product plane elements. The precharge circuit 140 sets the output line 142 high. The Summation plane element 144, if active, will cause the output line 142 to go low if the product term line 132 is high. The Summation plane element 144 includes a memory element 146 which determines whether the Summation plane element is active. The memory element 146, if high, will connect the product term line 132 through transistor 148 to the gate of transistor 150. If the memory element 146 is low, the transistor 148 isolates the gate of the transistor 150 such that the transistor 150 cannot turn on. The Summation plane element 144 also has a protection circuitry 152.

Note that both the Product plane and Summation plane are preferably implemented as NOR planes. NOR planes speed the operation of the reconfigurable programmable sum of products generator since each pull-down transistor, such as transistor 130 in the Product plane, operates in parallel rather than in series.

The memory element in the Product and Summation plane elements preferably allows for backup configurations. For example, the memory plane elements can be implemented as a master slave flip-flops element to provide a backup configuration for the programmable sum of products generator. The configuration memories including the memory elements of the Product and Summation plane elements can be loaded from off chip. In one embodiment, the active plane can be loaded in the programmable sum of products generator while a backup configuration plane is loaded from off of the reconfigurable chip.

In one embodiment, the configuration memory of the programmable sum of products generator is part of a larger configuration memory system for the chip. Blocks of configuration data can be loaded from off of the chip using a Direct Memory Access (DMA) controller. Configuration loading lines (not shown) and select lines (not shown) are connected to the programmable sum of products generator configuration memory, including memory elements 124 and 146, to allow configuration data to be loaded.

FIGS. 5–15 illustrate one embodiment of the present invention. The numbers and arrangements described with respect to these figures are exemplary and are not meant to be limiting.

FIG. 5 is a diagram illustrating the control fabric unit of a preferred embodiment of the present invention. The Control Unit (CU) or control fabric unit for the fabric can essentially be broken down into four primary blocks, namely, Muxing Plane (MP)
Programmable sum of products generator (PSOP)
State register block (SRB)
Control state memory (CSM)

The control state memory determines a data path unit configuration. The muxing plane, programmable sum of products generator and state register block comprising a state machine unit. The control unit talks to the CPU and the DPU's. The local state outputs (2 and 3), the $7^{th}$ horizontal global DPU data lines, the global states (2 and 3), the DPU flags and system commands (such as start), are primarily the inputs into the programmable sum of products generator. All the above mentioned inputs go into the muxing plane and based on the configuration settings, the corresponding inputs are input into the programmable sum of products generator. The programmable sum of products generator is preferably implemented as a NOR NOR INV for CMOS processes. The configuration memory is embedded into the PLA itself The configuration can have multiple associated depth. In a preferred embodiment, there are sixteen input lines and thirty-two outputs with sixteen product terms. Since one of the inputs into the programmable sum of products generator is the start bit, the output of the programmable sum of products generator will be a clock enable that gates all the clocks of the DPU. The outputs of the programmable sum of products generator feed the state block whose primary task is to store the state and provide for the configuration state memory with the address. It also transfers the state to the vertical and horizontal state routing and bit routing structures. The CPU also has the ability to read and write into the state registers. The state block also has an interrupt register/row which can be read by the CPU on to the CPU read data bus. Once the interrupt has been handled the CPU clears the register. The configuration state memory gets its input from the configuration and the state register block. The configuration state memory is preferably an eight deep configuration memory, the output of which is determined by the address provided by the state register block.

FIG. 6 shows an embodiment with a single programmable sum of products generator is used for multiple data path units in a single tile. The programmable sum of products generator sends to and receives data from more than one functional unit. The reconfigurable programmable sum of products generator has sixteen inputs, two bits from each DPU control row. There are thirty-two outputs, four per DPU control row. The outputs are determined by the inputs applied to it and the way the configuration memory, which is embedded in the programmable sum of products generator is configured by the user. This programmable sum of products generator can implement any function of four inputs with thirty-two outputs. The Product-Summation structure of the programmable sum of products generator is preferably implemented as a Nor-Nor-Inv plane. The output of the $1^{st}$ NOR plane forms the product term. Some of the inputs to the programmable sum of products generator can be feedbacks from the state block itself. These inputs can be optionally inverted. This is how the programmable sum of products generator can be directly used to implement state machines. The programmable sum of products generator also generates the configuration state machine addresses.

FIG. 7 illustrates one embodiment of the muxing plane for use with the present invention. The Product plane and Summation plane are both pre-charged when the clock is high. There is a falling edge triggered flop on both the inputs and the outputs. This helps to not disturb the pre-charge lines while the clock is high and the array is pre-charging. While the clock is high, the muxing plane is also evaluating the data, depending on the configuration of the muxing plane. When the clock goes low, the muxing plane has evaluated and the data is ready at the inputs of the programmable sum of products generator. The evaluation of the programmable sum of products generator inputs happens, based on a delayed version of the clock (for timing reasons) and the configuration of the programmable sum of products generator. The outputs are then applied to the state register block, before the rising edge of the next clock.

The primary function of the muxing plane is to take the inputs from the various sources and provide inputs to the programmable sum of products generator based on the configuration of the muxes. Each input to the programmable sum of products generator comes from a 64:1 mux, the inputs of which are described below. The odd and even inputs are slightly different; the differences are pointed out where applicable.

STATE INPUTS (32): There are thirty-two states that are inputs to the 64:1 mux. These thirty-two states come from the last state register from the state register block (there are 4 state registers in the state register block, in this document, the primary state refers to the $3^{th}$ state and the secondary state is the $2^{rd}$ state from the state register block) block of each DPU row. There are thirty-two DPU rows, hence, thirty-two primary state bits/slice (8/tile). The state bits run the entire length of the slice.

FLAG INPUTS (28): In each tile there are preferably seven DPUs and one Multiplier. Each DPU generates two flags, Flag 0 is the one that runs vertically across the slice. Since there are twenty-eight DPUs per slice, there are twenty-eight Flag bits, which are input to each input mux of the programmable sum of products generator. Like the state, flag 1 is the primary flag and flag 0 is the secondary flag.

HBIT INPUT (1): State 2 and 3 of the state register block also go to the horizontal bit routing structure (tristate bus). This runs the entire width of the chip across the four slices. There are two hbits per DPU row, hence there are sixteen hbits per tile. State 2 and 3 form the even and odd bits of the hbit bus. e.g. State 2 and 3 of DPU row 0 form hbit (0:1); State2,3 of DPU row 1 form hbit(2:3) and so on. These 16 inputs go to the respective inputs to the programmable sum of products generator.

SECONDARY STATE and FLAG INPUT (1): The secondary state and flag (described above) of the respective DPU row go to the even and odd input muxes respectively.

I/O and INTERRUPT REQUEST INPUT (1): There are eight bits from the I/O that run the entire length of the slice, these go to the even input mux of each programmable sum of products generator in the slice. The corresponding input for the odd muxes of programmable sum of products generator, get the interrupt request generated for the respective DPU row.

SPARE INPUT (1): There is one spare input which is currently grounded and is available for use should there be a need.

FIG. 8 illustrates one embodiment of a state register block that can be used with the present invention. The state register block contains four state registers and the miscellaneous control logic. The data in the state register block can come from the output of the programmable sum of products generator, or from the CPU write data bus. The latter is primarily used for debugging purposes, where the CPU can force a state. The CPU can also read from the state register block. There is a clock enable that controls the data going to the registers, which is helpful in single stepping and debugging. There is also a mode where the configuration can force zeros on the CSM address lines. States 2 and 3 drive the horizontal bit tristate bus. State 3 only drives the STATE bus and state 2 drives the LSTATE bus (which drives HBIT bus). The SRB also has the interupt register. The interrupt register is set by the state of register 2 or 3, or by the flag. This register is read on to an ireg bus which is thirty-two bits wide for the whole slice. (There is 1 ireg bit /dpu control row.) The interrupt is generated by "or"ing all the outputs of the ireg bit's in the 32 dpu control rows in a slice. There is only one interrupt/slice. Should an interrupt be generated by the slice, the CPU then read the ireg bus, which eventually goes to the CPU read bus. After the CPU has handled the interrupt, it sets the interrupt clear signal which then resets the interrupt register.

FIG. 9A illustrates the configuration state memory for one DPU control row. FIG. 9B shows an alternate embodiment of a configuration state memory. FIGS. 10–15 illustrate the interconnection between the units of the present invention.

The configuration state memory is preferably an eight deep memory, which can be written by the configuration bus to a location based on the address generated by the state register block. The output of the configuration state memory drives the DPU control lines. For a DPU this memory is forty-five bits wide and for a multiplier it is twenty-seven bits wide. The memory itself is a master slave flip flop with the master clock writing the data from the config bus into the dormant plane. There are many master clocks, to load different locations of the configuration state memory. There is only one slave clock, which transfers the data from the dormant plane to the active plane. It takes many cycles to load the dormant plane, but only one cycle to load the active plane. The loading of the active plane is staggered through buffers to not draw a large instantaneous current when we switch from the dormant plane to the active plane.

It will be appreciated by those of ordinary skill in the art that the invention can be implemented in other specific forms without departing from the spirit or central character thereof. The presently disclosed embodiments are therefore considered in all respects to be illustrative and not restrictive. The scope of the invention is illustrated by the appended claims rather than the foregoing description, and all changes which come within the meaning and range for equivalence thereof are intended to be embraced herein.

We claim:

1. A reconfigurable logic system including:
a control fabric unit adapted to set the configuration of at least one reconfigurable functional unit, the control fabric unit including a state machine unit adapted to produce a configuration address output and at least one configuration memory operably connected to the state machine unit, the configuration memory storing a number of configurations for a configurable functional unit, wherein the configurable functional unit operates on data and wherein the configuration memory is adapted to use the configuration address output to select a configuration for the configurable functional unit and wherein the state machine unit includes a reconfigurable programmable sum of products generator with an associated configuration memory.

2. The reconfigurable logic system of claim 1, wherein the configuration memory stores multiple configurations for the programmable sum of products generator.

3. The reconfigurable logic system of claim 1, wherein the controller fabric unit is arranged to set the configuration of more than one configurable functional unit.

4. The reconfigurable logic unit of claim 3, wherein the control fabric unit includes a single programmable sum of products generator which stores the state for multiple configurable functional units.

5. A reconfigurable logic system including:
a control fabric unit adapted to set the configuration of at least one reconfigurable functional unit, the control fabric unit including a state machine unit adapted to produce a configuration address output and at least one configuration memory operably connected to the state machine unit, the configuration memory storing a number of configurations for a configurable functional unit, wherein the configurable functional unit operates on data and wherein the configuration memory is adapted to use the configuration address output to select a configuration for the configurable functional unit and wherein the state machine unit includes a programmable sum of products generator wherein the control fabric units further include a multiplexer operably connected to the programmable sum of products generator, the multiplexer being used to select the inputs to the programmable sum of products generator.

6. The reconfigurable logic system of claim 5 further comprising a state register block operably connected between the programmable logic and the configuration memory.

7. The reconfigurable logic system of claim 1, wherein the state machine unit includes a programmable sum of products generator which is implemented as a NOR-NOR-INV configuration.

8. The reconfigurable system of claim 1, wherein the configurable functional unit comprises a data path unit.

9. The reconfigurable logic system of claim 1, wherein the system comprises a reconfigurable chip.

10. The reconfigurable system of claim 1, wherein the configuration memory is part of a second state machine unit.

11. The reconfigurable system of claim 10, wherein configuration memory includes a configuration data field and address field.

12. A reconfigurable logic system including:
a control fabric unit adapted to set the configuration of at least one reconfigurable functional unit, the control fabric unit including a state machine unit adapted to produce a configuration address output and at least one configuration memory operably connected to the state machine unit, the configuration memory storing a number of configurations for a configurable functional unit, wherein the configurable functional unit operates on data and wherein the configuration memory is adapted to use the configuration address output to select a configuration for the configurable functional unit wherein the configuration memory is part of a second state machine unit and wherein configuration memory includes a configuration data field and address field wherein the configuration memory includes a control bit field that controls a multiplexer at the input to the configuration memory, the control bit determining whether the input to the configuration memory is from the address field or whether the first state machine provides the next state.

13. A reconfigurable logic system including:
a control fabric unit adapted to set the configuration of at least one reconfigurable functional unit, the control fabric unit including a state machine unit adapted to produce a configuration address output and at least one configuration memory operably connected to the state machine unit, the configuration memory storing a number of configurations for a configurable functional unit, wherein the configurable functional unit operates on data and wherein the configuration memory is adapted to use the configuration address output to select a configuration for the configurable functional unit and wherein the configuration memory is part of a second state machine unit and wherein the address of the data configuration to be sent to the configurable functional unit can be selected by the first state machine or the control state memory state machine.

14. A reconfigurable logic system comprising:
a configurable functional unit adapted to operate on input data, the configurable functional unit including reconfigurable elements; and
a control fabric unit adapted to set reconfigurable elements in the configurable functional unit, the control fabric unit including a configuration memory and a state machine unit wherein the state machine unit further includes a multiplexer connected to a programmable sum of products generator.

15. The reconfigurable logic system of claim 14, further comprising a state register block is operatively connected to the programmable sum of products generator and to the configuration memory.

16. The reconfigurable logic system of claim 14, wherein the control fabric is associated with multiple configurable functional units.

17. The reconfigurable logic system of claim 14, wherein the configurable functional unit comprises a data path unit.

18. A reconfigurable logic system including:
a control fabric unit adapted to set reconfigurable elements in at least one configurable functional unit, the control fabric including a programmable sum of products generator adapted to implement a state machine and at least one configuration memory operably connected to the programmable sum of products generator, the configuration memory storing a number of configurations for the configurable functional unit, wherein the configurable functional unit is adapted to operate on data wherein the programmable sum of products generator is a reconfigurable programmable sum of products generator with an associated configuration memory.

19. The reconfigurable logic system of claim 5, wherein the multiplexer is part of a muxing plane.

20. The reconfigurable logic system of claim 14, wherein the multiplexer is part of a muxing plane.

21. A reconfigurable logic system comprising:
a configurable functional unit adapted to operate on input data, the configurable functional unit including reconfigurable elements; and
a control fabric unit adapted to set reconfigurable elements in the configurable functional unit, the control fabric unit including a configuration state memory and a state machine unit, the state machine unit adapted to provide addresses for the configuration state memory wherein information from the configurable functional unit is adapted to be feedback to the state machine unit in the control fabric unit.

22. The reconfigurable logic system of claim 14, further comprising a multiplexer, wherein the information from the configurable functional unit can be feedback to the state machine using the multiplexer.

23. A reconfigurable logic system comprising:
a reconfigurable functional unit adapted to operate on input data, the configurable functional unit including reconfigurable elements; and
a control fabric unit adapted to set reconfigurable elements in the configurable functional unit, the control fabric unit including a configuration state memory and a reconfigurable state machine unit, the configuration state memory adapted to provide configuration data to the reconfigurable functional unit, the reconfigurable state machine unit adapted to provide addresses for the configuration state memory wherein the state machine has an associated configuration memory storing a configuration for the state machine.

24. A reconfigurable logic system comprising:
a state machine input multiplexer;
a reprogrammable state machine unit receiving input through the multiplexer;
a configuration state memory addressed by state machine; and
a reconfigurable functional unit configured by the configuration state memory.

25. The reconfigurable logic system of claim 24, wherein the state machine is shared by several reconfigurable functional units.

26. The reconfigurable logic system of claim 24, wherein the state machine unit includes a reconfigurable programmable sum of products generator and state machine memory.

27. The reconfigurable logic system of claim 26, wherein the reconfigurable programmable sum of products generator is shared with multiple state machine memories.

28. A reconfigurable logic system comprising:
- a number of reconfigurable functional units adapted to operate on input data, the reconfigurable functional units including reconfigurable elements;
- at least one configuration state memory adapted to provide configuration data to at least of the reconfigurable functional units; and
- at least one reconfigurable state machine unit adapted to provide addresses for at least one configuration state memory, wherein said number of reconfigurable functional units are active at the same time.

29. A reconfigurable logic system comprising a number of reconfigurable functional units adapted to operate on input data, the reconfigurable functional units including reconfigurable elements, each reconfigurable functional unit have an associated configuration state memory adapted to provide configuration data to at least of the reconfigurable functional units, and at least one reconfigurable state machine unit adapted to provide addresses for at least one configuration state memory, wherein said number of reconfigurable functional units are active at the same time.

30. A reconfigurable logic system comprising a number of reconfigurable functional units adapted to provide addresses for more than one configuration state memory, each configuration state memory adapted to provide configuration data to an associated reconfigurable functional unit, each of the reconfigurable functional units adapted to operate on input data, the reconfigurable functional units including reconfigurable elements, wherein said number of reconfigurable functional units are active at the same time.

31. A reconfigurable logic system comprising multiple reconfigurable state machine units, each reconfigurable state machine unit adapted to provide addresses for more than one configuration state memory, each configuration state memory adapted to provide configuration data to an associated reconfigurable functional unit, each of the reconfigurable functional units adapted to operate on input data, the reconfigurable functional units including reconfigurable elements, wherein multiple reconfigurable functional units are active at the same time.

* * * * *